Patented May 27, 1941

2,243,409

UNITED STATES PATENT OFFICE 2,243,409

BITUMINOUS COMPOSITION

Emile L. Baldeschwieler, Cranford, N. J., assignor to Standard Oil Development Company, a corporation of Delaware No Drawing. Application September 4, 1937, Serial No. 162,453

3 Claims. (Cl. 106—31)

This invention relates to improvements in asphalt manufacture with special reference to asphalts employed in the road and building industries with improved physical properties.

One of the main causes for the failure of asphalt paving or other surfaces, especially those made with certain types of mineral aggregate and which are in contact with moisture for extended periods of time, is the inability of the asphalt binder to remain bonded to the aggregate surface. The term "adhesivity" is herein used to denote the ability of the asphalt to resist displacement from mineral aggregate surface by water. An object of this invention is to provide a bituminous composition having a high degree of adhesivity for mineral aggregates.

It has now been found that metallic soaps, when blended in relatively small proportions in a hydrocarbon composition and maintained at elevated temperatures, increase in acidity. This increase in acidity, when obtained in a bituminous composition, increases the adhesivity of the bituminous composition to a mineral aggregate. The metallic soap preferred is a lead soap, though other soaps may be used such as thallium soaps, etc. Lead soaps, especially the oil-soluble type preferably obtained by double decomposition of the sodium soaps of the organic acid with aqueous solutions of the metal salts, have been found highly suitable for this purpose. The lead soaps may also be prepared by heating mixtures of high molecular weight acids, such as stearic, oleic, naphthenic, abietic, acids obtained by the oxidation of mineral oils and waxes, linoleic, tall oil acids, palmitic or other fatty acids, locanic, or the hydrogenated products of these acids, and the like, with a lead oxide such as litharge or by other methods known to those skilled in the art. Lead oleate is very effective for this purpose. Acids of lard oil, Menhaden oil, whale oil, fish oil and acids obtained by oxidizing cracked paraffin wax may also be used in the preparation of the said soaps.

Adhesivity of bituminous compositions containing the various soaps and acids is determined in the laboratory by the following tests: Water displacement test, water boiling test and briquet soaking test.

The water displacement test is as follows: Mineral aggregate of ¼" to 10 mesh aggregate is coated with 2½% of the bituminous composition in the form of a rapid curing cutback containing 67% of asphalt. After coating, the aggregate is spread out and cured for 1 hour at room temperature and is then completely covered with distilled water for 18 hrs. at room temperature. At the end of this period and while submerged, a preliminary estimation is made of the per cent of the aggregate surface still coated with asphalt. The aggregate still submerged in water is cooled to 40° F. for at least one hour after which the cold water is drained off, the aggregate spread out on a can cover and placed under an electric fan for rapid drying. When the surface of the aggregate is sufficiently dry, a final evaluation of the percentage of aggregate surface still coated with asphalt is made.

The water boiling test measures the resistance of an asphalt coating to displacement by water at its boiling point and consists in boiling the coated aggregate (which has been cured for two days at 140° F.) in distilled water for one minute, and an estimation is then made of the per cent of the aggregate surface still coated with asphalt.

The briquet soaking test consists in first coating ¼" to 10 mesh aggregate with 2½% of a cutback containing 67% of the asphalt under test. The cutback coated aggregate is then placed in a standard strength test mould used for testing the tensile strength of cement. In preparing the briquet, the cutback coated aggregate is formed into the mould under a load of 71.5 pounds/sq. in. for 5 minutes. The thickness of the mould is 1". After curing at 140° F. for 96 hours, the briquet is removed from the mould and kept under water until disintegration takes place. The number of days required for the breaking off of the first pieces of the briquet is designated the initial failure, and for the disintegration of 50% of the perimeter of the briquet, final failure.

According to this invention, the acidity of asphalt is increased by incorporating into the asphalt 0.5 to 3% of a soluble lead soap and maintaining the mixture continuously at an elevated temperature, such as 210 to 350° F. for about 5 days or more, preferably without blowing with an oxygen containing gas. When the mixture is blown with an oxygen containing gas, shorter periods of time are required, but on the other hand, the vapors should be refluxed to avoid a loss of the more volatile acidic products.

The increase in acidity will be understood with reference to the following table:

TABLE I

| Material | Neutralization number |
|---|---|
| 180° F. softening point asphalt+2% lead soap before heating | 3.5 |
| 180° F. softening point asphalt +2% lead soap after heating | 5.7 |
| 140° F. softening point asphalt+2% lead soap before heating | 2.4 |
| 140° F. softening point asphalt+2% lead soap after heating 289 hours at 210° F | 7.1 |
| 140° F. softening point asphalt+2% lead soap after heating 289 hours at 250° F | 6.2 |
| 135° F. melting point paraffin wax+2% lead soap before heating | 0.3 |
| 135° F. melting point paraffin wax+2% lead soap after heating 259 hours at 250° F | 3.7 |
| 135° F. melting point paraffin wax in contact with granulated lead after heating 259 hours at 250° F | 1.6 |
| 135° F. melting point paraffin wax in contact with thallium shaving after heating 259 hrs. at 210° F | 0.1 |

It has also been found that lead soaps alone, even before heating, when added to a bitumen, increase the adhesivity of the bituminous composition.

In the following table is disclosed the effect of the addition of the various soaps on the adhesivity of the bituminous mixture. It will be noted that maximum adhesivity is obtained with concentrations of 1 to 2.5%, the adhesivity being lower with lower soap concentration.

TABLE II

Effect of per cent of agent on asphalt adhesivity

| Agent in asphalt | Percent agent based on asphalt | Adhesivity measurement | | |
|---|---|---|---|---|
| | | Displacement test | Boiling test | |
| | | | 1 min. | 5 min. |
| Lead soap of acids from oxidized paraffin wax | 2.5 | 90/100 | 80/90 | 80/90 |
| Do | 2.0 | 90 | 80/90 | 80 |
| Do | 1.5 | 70/80 | 80 | 60/70 |
| Do | 1.0 | 50 | 50 | 20/30 |
| Lead naphthenate | 2.5 | 80/90 | 80/90 | 70/80 |
| Do | 2.0 | 50/60 | 70 | 60 |
| Do | 1.5 | 20/30 | 30/40 | 10/20 |
| Do | 1.0 | 20 | 20 | 10 |
| Lead oleate | 2.5 | 80 | 80/90 | 90 |
| Do | 2.0 | 40/50 | 60/70 | 70/80 |
| Do | 1.5 | 30/40 | 50 | 50/60 |
| Do | 1.0 | 20/30 | 40 | 30/40 |

In the briqueting soaking test containing bituminous composition with 2½% of lead naphthenate soap, the briquet was kept under water for 390 days before final failure resulted.

It was found that practically the same improvement in adhesivity is obtained by the use of the various agents with asphalts from Mexican (Panuco), Venezuelan, Mid-Continent, Colombian or cracking coil tar sources when treated with 2½% by weight of lead oleate or the lead salt of the fatty acids obtained on oxidizing paraffin wax.

Paving mixtures are prepared by mixing a mineral aggregate with at least 2½% and not over 10% of a bituminous composition containing the lead soaps in solution. Paving mixtures may also be prepared by mixing the mineral aggregate with an aqueous emulsion of the asphalt containing the lead soaps.

In the case of alkaline aggregates, such as limestone, it is especially advantageous to increase the acidity of the asphalt by air-blowing at elevated temperature or otherwise. When asphalt alone is air-blown, a very high temperature is required for reaction, in the neighborhood of 500–600° F. Under such conditions most of the acids formed by the oxidation are driven off with the excess air, so that the actual asphalt acidity is not substantially increased.

These bituminous compositions can also be used in emulsion form, i. e., aqueous and other emulsions. The spreading and adhesivity of bituminous paint compositions containing metal soaps are superior to that of the same bitumen emulsion without the added soap in solution.

It is not the intention to limit this invention to the examples which are given to illustrate the various improvements obtained in the art or to any mechanism of operation, but it is intended to claim the invention as broadly as the prior art permits.

I claim:
1. Method of improving the adhesivity of a bituminous composition which comprises adding approximately 1 to 2½% of an asphalt soluble lead soap to an asphalt and maintaining at a temperature of 210° F. to 350° F. for at least 5 days.
2. Method of improving the adhesivity of a bituminous composition according to claim 1 in which the lead soap is lead oleate.
3. Method of improving the adhesivity of a bituminous composition according to claim 1 in which the lead soap is a lead soap of acids from oxidized paraffin wax.

EMILE L. BALDESCHWIELER.